(12) United States Patent
Wyner et al.

(10) Patent No.: US 8,871,328 B2
(45) Date of Patent: Oct. 28, 2014

(54) IMPACT AND VIBRATION ABSORBING BODY-CONTACTING MEDALLIONS, METHODS OF USING AND METHODS OF MAKING

(76) Inventors: Daniel M. Wyner, North Scituate, RI (US); Thomas F. Cafaro, Foster, RI (US); Richard B. Fox, Smithfield, RI (US); Jeffrey H. Bowie, Chepachet, RI (US)

( * ) Notice: Subject to any disclaimer, the term of this patent is extended or adjusted under 35 U.S.C. 154(b) by 801 days.

(21) Appl. No.: 12/102,859

(22) Filed: Apr. 14, 2008

(65) Prior Publication Data

US 2009/0035524 A1    Feb. 5, 2009

Related U.S. Application Data

(60) Provisional application No. 60/923,295, filed on Apr. 13, 2007, provisional application No. 60/923,294, filed on Apr. 13, 2007.

(51) Int. Cl.

| | | |
|---|---|---|
| *B32B 3/00* | (2006.01) | |
| *B32B 33/00* | (2006.01) | |
| *B32B 9/00* | (2006.01) | |
| *A41D 13/00* | (2006.01) | |
| *A41D 13/08* | (2006.01) | |
| *B29C 65/02* | (2006.01) | |
| *B29C 65/00* | (2006.01) | |
| *F16F 9/30* | (2006.01) | |
| *B29L 31/00* | (2006.01) | |
| *B29L 31/30* | (2006.01) | |
| *B29L 31/50* | (2006.01) | |
| *B29L 22/02* | (2006.01) | |
| *A41D 31/00* | (2006.01) | |

(52) U.S. Cl.
CPC .............. *A41D 13/082* (2013.01); *B29C 65/02* (2013.01); *B29C 66/433* (2013.01); *B29L 2031/771* (2013.01); *B29L 2031/3091* (2013.01); *B29L 2031/504* (2013.01); *B29L 2022/02* (2013.01); *B29L 2031/50* (2013.01); *F16F 9/30* (2013.01); *B29L 2031/753* (2013.01); *A41D 31/005* (2013.01)
USPC ............... 428/156; 428/40.1; 428/41.8; 2/16; 2/20

(58) Field of Classification Search
USPC ......... 428/156, 40.1, 41.8, 72, 161, 162, 178, 428/41.9, 42.2, 42.3; 2/159, 161.1, 167, 16, 2/20, 19, 160, 161.2, 161.6, 161.7; 602/54, 57
See application file for complete search history.

(56) References Cited

U.S. PATENT DOCUMENTS

| | | |
|---|---|---|
| 1,596,347 A | 8/1926 | Gilowitz |
| 1,625,582 A | 4/1927 | Anderson |

(Continued)

FOREIGN PATENT DOCUMENTS

| | | |
|---|---|---|
| JP | 05-339399 | 12/1993 |
| WO | WO97/26821 | 7/1997 |

(Continued)

OTHER PUBLICATIONS

Teknor Apex "Monprene", www.teknorapex.com.

(Continued)

*Primary Examiner* — Catherine A Simone
(74) *Attorney, Agent, or Firm* — Whiteford, Taylor & Preston, LLP; Peter J. Davis

(57) ABSTRACT

The present disclosure relates to cushioning medallions, methods of making and methods of using, particularly cushioning medallions comprising a relatively low durometer viscoelastic polymer gel, for use in gloves or on the body.

1 Claim, 13 Drawing Sheets

(56) References Cited

U.S. PATENT DOCUMENTS

| | | |
|---|---|---|
| 2,449,373 A | 9/1948 | Falge et al. |
| 2,631,407 A | 3/1953 | Rempel |
| 2,668,394 A | 2/1954 | Auzin |
| 2,698,272 A | 12/1954 | Clapp et al. |
| 2,956,313 A | 10/1960 | Choice |
| 2,960,794 A | 11/1960 | Johns |
| 3,982,335 A | 9/1976 | Cunningham et al. |
| 4,009,298 A | 2/1977 | Cavanagh |
| 4,168,754 A | 9/1979 | Nyholm |
| 4,234,640 A | 11/1980 | Wittel |
| 4,240,224 A | 12/1980 | Katzman et al. |
| 4,242,398 A | 12/1980 | Segawa et al. |
| 4,292,735 A | 10/1981 | Thillays |
| 4,369,284 A | 1/1983 | Chen |
| 4,381,579 A | 5/1983 | Rumpp |
| 4,415,954 A | 11/1983 | Schaefer |
| 4,416,166 A | 11/1983 | Jannard et al. |
| 4,429,915 A | 2/1984 | Flager |
| 4,476,742 A | 10/1984 | Midgley |
| 4,538,787 A | 9/1985 | Fox et al. |
| 4,552,944 A | 11/1985 | Kamiyama et al. |
| 4,581,187 A | 4/1986 | Sullivan et al. |
| 4,611,851 A | 9/1986 | Noyes et al. |
| 4,666,782 A | 5/1987 | Tada et al. |
| 4,683,671 A | 8/1987 | Farrar |
| 4,716,662 A | 1/1988 | Bar |
| 4,722,946 A | 2/1988 | Hostettler |
| 4,794,658 A | 1/1989 | Goodale |
| 4,805,319 A | 2/1989 | Tonkel |
| 4,842,332 A | 6/1989 | Conner, Jr. et al. |
| 4,853,069 A | 8/1989 | Williams et al. |
| 4,910,886 A | 3/1990 | Sullivan et al. |
| 4,952,439 A | 8/1990 | Hanson |
| 4,956,932 A | 9/1990 | Cupp |
| 4,998,367 A | 3/1991 | Leibowitz |
| 5,098,421 A | 3/1992 | Zook |
| 5,108,076 A | 4/1992 | Chiarella |
| 5,112,543 A | 5/1992 | Thary |
| 5,143,390 A | 9/1992 | Goldsmith |
| 5,144,708 A | 9/1992 | Pekar |
| 5,147,589 A | 9/1992 | Chang et al. |
| 5,163,646 A | 11/1992 | Engelhardt |
| 5,203,607 A | 4/1993 | Landi |
| 5,215,699 A | 6/1993 | Lieberman |
| 5,233,845 A | 8/1993 | D'Andrade |
| 5,238,244 A | 8/1993 | Cotter et al. |
| 5,267,487 A | 12/1993 | Falco et al. |
| 5,280,993 A | 1/1994 | Hsh |
| 5,282,326 A | 2/1994 | Schroer, Jr. et al. |
| 5,318,344 A | 6/1994 | Wang |
| 5,330,249 A | 7/1994 | Weber et al. |
| 5,335,382 A | 8/1994 | Huang |
| 5,356,099 A | 10/1994 | Sereboff |
| 5,390,467 A | 2/1995 | Shuert |
| 5,409,648 A | 4/1995 | Reidel |
| 5,419,612 A | 5/1995 | Rassekhi |
| 5,419,730 A | 5/1995 | Diresta et al. |
| 5,420,381 A | 5/1995 | Gardner, Jr. et al. |
| 5,435,508 A | 7/1995 | Deuitch et al. |
| 5,445,349 A | 8/1995 | Hart |
| 5,476,491 A | 12/1995 | Mayn |
| 5,547,154 A | 8/1996 | Kirchhoff et al. |
| 5,551,173 A | 9/1996 | Chambers |
| 5,562,147 A | 10/1996 | Bortoloni |
| 5,568,907 A | 10/1996 | Wolfe et al. |
| 5,572,804 A | 11/1996 | Skaja et al. |
| 5,601,264 A | 2/1997 | Peart |
| 5,634,685 A | 6/1997 | Herring |
| 5,701,623 A | 12/1997 | May |
| 5,704,905 A * | 1/1998 | Jensen et al. .................... 602/58 |
| 5,709,870 A | 1/1998 | Yoshimura et al. |
| 5,720,518 A | 2/1998 | Harrison |
| 5,766,704 A | 6/1998 | Allen et al. |
| 5,829,073 A | 11/1998 | Lee |
| 5,837,314 A | 11/1998 | Beaton et al. |
| 5,846,063 A | 12/1998 | Lakic |
| 5,865,180 A | 2/1999 | Sigfrid |
| 5,904,396 A | 5/1999 | Yates |
| 5,921,840 A | 7/1999 | Diresta et al. |
| 5,932,046 A | 8/1999 | Yates |
| 5,938,277 A | 8/1999 | Rioux et al. |
| 5,939,157 A | 8/1999 | Allen et al. |
| 5,975,629 A | 11/1999 | Lorbiecki |
| 5,980,143 A | 11/1999 | Bayer et al. |
| 6,007,149 A | 12/1999 | Yates |
| 6,012,772 A | 1/2000 | Conde et al. |
| 6,012,997 A | 1/2000 | Mason |
| 6,029,962 A | 2/2000 | Shorten et al. |
| 6,030,035 A | 2/2000 | Yates |
| 6,076,784 A | 6/2000 | Selker |
| 6,093,468 A | 7/2000 | Toms et al. |
| 6,108,869 A | 8/2000 | Meessmann et al. |
| 6,135,550 A | 10/2000 | Tucho |
| 6,153,277 A | 11/2000 | Chang |
| 6,171,091 B1 | 1/2001 | Bettencourt |
| 6,199,304 B1 | 3/2001 | Ludemann |
| 6,305,115 B1 | 10/2001 | Cook |
| 6,305,743 B1 | 10/2001 | Wheeler |
| 6,311,423 B1 | 11/2001 | Graham |
| 6,324,703 B1 | 12/2001 | Chen |
| 6,355,343 B1 | 3/2002 | Glassock |
| 6,390,548 B1 | 5/2002 | Cole |
| 6,422,647 B1 | 7/2002 | Turudich |
| 6,425,194 B1 | 7/2002 | Brie |
| 6,445,378 B1 | 9/2002 | Flagg |
| 6,450,906 B1 | 9/2002 | Touhey et al. |
| 6,467,212 B1 | 10/2002 | Apel |
| 6,499,703 B2 | 12/2002 | Chou |
| 6,546,583 B1 | 4/2003 | Röhrig |
| 6,588,023 B1 | 7/2003 | Wright |
| 6,594,935 B2 | 7/2003 | Beretta |
| 6,601,272 B2 | 8/2003 | Stvartak et al. |
| 6,620,495 B1 | 9/2003 | Kobayashi et al. |
| 6,631,568 B2 | 10/2003 | Howlett et al. |
| 6,643,875 B2 | 11/2003 | Boso et al. |
| 6,698,510 B2 | 3/2004 | Serra et al. |
| 6,705,026 B1 | 3/2004 | Arbour |
| 6,726,791 B1 | 4/2004 | Oelund et al. |
| 6,797,765 B2 | 9/2004 | Pearce |
| 6,802,140 B2 | 10/2004 | Aslanides |
| 6,834,456 B2 | 12/2004 | Murello |
| 6,880,269 B2 | 4/2005 | Falone et al. |
| 6,893,366 B2 | 5/2005 | Falone et al. |
| 6,922,862 B1 | 8/2005 | Thompson |
| 6,944,974 B2 | 9/2005 | Falone et al. |
| 6,991,691 B2 | 1/2006 | Yoon |
| 7,037,571 B2 | 5/2006 | Fish et al. |
| 7,048,879 B2 | 5/2006 | Kobayashi et al. |
| 7,114,783 B2 | 10/2006 | Warren et al. |
| 7,159,342 B2 | 1/2007 | Grisoni et al. |
| 7,183,523 B2 | 2/2007 | Lu |
| 7,261,525 B2 | 8/2007 | Pekar |
| 7,264,533 B2 | 9/2007 | Chan et al. |
| 7,424,760 B2 | 9/2008 | Chaffee |
| 7,448,676 B2 | 11/2008 | Wyner et al. |
| 7,827,704 B2 * | 11/2010 | Fox et al. .................... 36/44 |
| 8,091,963 B2 * | 1/2012 | Wyner et al. .................... 297/214 |
| 8,453,348 B2 * | 6/2013 | Fox et al. .................... 36/44 |
| 2001/0001351 A1 | 5/2001 | Dieckhaus |
| 2001/0055684 A1 | 12/2001 | Davis et al. |
| 2002/0030295 A1 | 3/2002 | De Winter et al. |
| 2002/0064641 A1 | 5/2002 | Kobayashi et al. |
| 2002/0095107 A1 | 7/2002 | Martin |
| 2002/0178621 A1 | 12/2002 | Darby |
| 2002/0192452 A1 | 12/2002 | Harrison et al. |
| 2003/0044313 A1 | 3/2003 | Lee |
| 2003/0070259 A1 | 4/2003 | Brown et al. |
| 2003/0070321 A1 | 4/2003 | Davis et al. |
| 2003/0080458 A1 | 5/2003 | Heilig et al. |
| 2003/0106132 A1 | 6/2003 | Terris et al. |
| 2003/0116883 A1 | 6/2003 | Thiessen |
| 2003/0132359 A1 | 7/2003 | Brophy |
| 2003/0135943 A1 | 7/2003 | Meyer et al. |
| 2003/0136025 A1 | 7/2003 | Galbraith et al. |

(56) References Cited

U.S. PATENT DOCUMENTS

| | | |
|---|---|---|
| 2003/0154567 A1 | 8/2003 | Drossler et al. |
| 2003/0161999 A1 | 8/2003 | Kannankeril et al. |
| 2003/0194526 A1 | 10/2003 | Vesley et al. |
| 2004/0048688 A1 | 3/2004 | Hogge et al. |
| 2004/0078998 A1 | 4/2004 | Davis et al. |
| 2004/0089965 A1 | 5/2004 | Malfliet et al. |
| 2004/0134098 A1 | 7/2004 | Beck |
| 2004/0144011 A1 | 7/2004 | Vignaroli et al. |
| 2004/0154133 A1 | 8/2004 | Polzin et al. |
| 2004/0191301 A1 | 9/2004 | Van Duren |
| 2004/0209059 A1 | 10/2004 | Foss |
| 2004/0247912 A1 | 12/2004 | Kim |
| 2005/0008867 A1 | 1/2005 | LaBatt |
| 2005/0038368 A1 | 2/2005 | Richter et al. |
| 2005/0101693 A1 | 5/2005 | Arbogast et al. |
| 2005/0126038 A1 | 6/2005 | Skaja et al. |
| 2005/0210710 A1 | 9/2005 | Chen |
| 2005/0218555 A1 | 10/2005 | De Winter et al. |
| 2005/0241186 A1 | 11/2005 | Mulligan et al. |
| 2005/0287342 A1 | 12/2005 | Miyazaki et al. |
| 2005/0287346 A1 | 12/2005 | Miyazaki et al. |
| 2006/0010608 A1 | 1/2006 | DeFranks et al. |
| 2006/0075658 A1 | 4/2006 | Mitchell |
| 2006/0168710 A1 | 8/2006 | Vito et al. |
| 2006/0182787 A1* | 8/2006 | Jaenichen et al. ............ 424/445 |
| 2006/0210773 A1 | 9/2006 | Kannankeril |
| 2006/0226578 A1 | 10/2006 | Farnworth et al. |
| 2006/0230643 A1 | 10/2006 | Affleck |
| 2006/0254088 A1 | 11/2006 | McCormick |
| 2006/0277788 A1 | 12/2006 | Fujii |
| 2006/0277801 A1 | 12/2006 | Schwarze et al. |
| 2006/0277950 A1 | 12/2006 | Rock |
| 2007/0033834 A1 | 2/2007 | Cheskin et al. |
| 2007/0061978 A1 | 3/2007 | Losio |
| 2007/0072712 A1 | 3/2007 | Chernick et al. |
| 2007/0113317 A1* | 5/2007 | Garneau ........................ 2/161.1 |
| 2007/0199155 A1 | 8/2007 | Thygsen |
| 2007/0226911 A1 | 10/2007 | Gladney et al. |
| 2007/0261274 A1 | 11/2007 | Fox et al. |
| 2008/0010861 A1 | 1/2008 | Kosmas |
| 2008/0034614 A1 | 2/2008 | Fox et al. |
| 2008/0222918 A1 | 9/2008 | Hesse |
| 2008/0299163 A1 | 12/2008 | Haskin et al. |
| 2009/0029147 A1 | 1/2009 | Tang et al. |
| 2009/0090028 A1 | 4/2009 | Moramarco et al. |
| 2009/0255625 A1 | 10/2009 | Fox et al. |
| 2010/0005595 A1 | 1/2010 | Gladney et al. |
| 2010/0159192 A1 | 6/2010 | Cotton |

FOREIGN PATENT DOCUMENTS

| | | |
|---|---|---|
| WO | WO2004/007166 | 1/2004 |
| WO | WO2005/004658 | 1/2005 |
| WO | WO 2005004936 A1 * | 1/2005 |
| WO | WO2007/092091 | 8/2007 |
| WO | WO2010/110804 | 9/2010 |

OTHER PUBLICATIONS

Electronic Products, "Gap-filler Pad Improves Compressiblity", www.electronicproducts.com.

U.S. Appl. No. 11/644,266, filed Dec. 23, 2006, Title: Methods of Making Polymeric Articles and Polymeric Articles Formed Thereby, Inventors: Fox et al.

U.S. Appl. No. 12/904,717, filed Oct. 14, 2010, Title: Methods of Making Polymeric Articles and Polymeric Articles Formed Thereby, Inventors: Fox et al.

U.S. Appl. No. 12/939,048, filed Nov. 3, 2010, Title: Methods of Making Polymeric Articles and Polymeric Articles Formed Thereby, Inventors: Fox et al.

U.S. Appl. No. 12/423,174, filed Apr. 14, 2009, Title: Deep Draw Method of Making Impact and Vibration Absorbing Articles and the Articles Formed Thereby, Inventors: Fox et al.

U.S. Appl. No. 13/155,644, filed Jun. 8, 2011, Title: Cushioning Medallions, Methods of Making and Methods of Using, Inventors: Wyner et al.

U.S. Appl. No. 12/325,725, filed Dec. 1, 2008, Title: Composite Material, Method of Making and Articles Formed Thereby, Inventors: Fox et al.

U.S. Appl. No. 13/008,471, filed Jan. 18, 2011, Title: Improved Molding System, Method and Articles Formed Thereby, Inventors: Fox et al.

U.S. Appl. No. 13/169,986, filed Jun. 27, 2011, Title: Methods of Making Polymeric Articles and Polymeric Articles Formed Thereby, Inventors: Fox et al.

U.S. Appl. No. 13/005,893, filed Jan. 13, 2011, Title: Responsive Insoles, Inventors: Fox et al.

U.S. Appl. No. 61/456,698, filed Nov. 10, 2010, Title: Unibody Cable and Method of Using, Inventors: Fox.

U.S. Appl. No. 61/520,385, filed Jun. 9, 2011, Title: Cushioning articles and methods of making, Inventors: LaFlamme

* cited by examiner

IMPACT AND VIBRATION ABSORBING BODY-CONTACTING MEDALLIONS, METHODS OF USING AND METHODS OF MAKING

RELATED CASES

The present application claims the benefit of U.S. Provisional Application Nos. 60/923,294 and 60/923,295, each of which was filed on Apr. 13, 2007, each of which is incorporated herein by reference in its entirety.

TECHNICAL FIELD

This disclosure relates to impact and vibration absorbing body-contacting medallions for protecting body parts and, in particular, to impact and vibration absorbing body-contacting cushioning medallions for protecting a user's hand.

BACKGROUND

Many examples exist of gel or foams that are used to reduce and/or absorb vibration or impact to various areas of the body. One such example is in the use of shock absorbing or cushioning materials in gloves, such as cycling gloves. While riding, cyclists experience the transmission of vibration and shock through their palms to their wrists, elbows, and shoulders. The constant set of vibrations caused by imperfections in the road have created a need for a glove which will absorb shock and vibration both to protect the cyclist from injury, and to make riding more pleasant.

Various types of cushioning materials have been used to provide cushioning in gloves. Examples of such cushioning materials include, but are not limited to, foamed plastics such as polyurethane foams and elastomeric polymer gels. In some instances, the foamed or gel cushioning materials are placed between other textile layers of the glove in specific areas to absorb impact. The materials may be used across a wide region of the glove, or they may be used in selected regions where impact is thought to be concentrated. In some cases, the use of gel or foam in selected and distinct areas can create a more flexible glove structure than if these cushioning materials were used in a larger format. The use of thick cushioning materials combined with multiple textile or leather layers in a glove can sometimes create a glove which is bulky or stiff.

In the case of bicycling gloves, it is in many cases undesirable for the user to have gloves covering their entire hands due to discomfort of generated heat as well as the desire to have as much dexterity in the fingers as possible for shifting gears, braking and the like. Thus, in many cases, gloves will be fabricated with a light-weight stretchable fabric on the back side of the hand (i.e. the non-impact side) and all of the cushioning focused in pads on the palm of the hand. In some cases, the fabric layers used on the non-impact side of the glove can be extremely lightweight or be made from open meshes to allow maximum breathability and dexterity. In addition, most warm weather bicycle gloves are fabricated without covering the fingers, to allow dexterity and movement of the fingers without interference.

SUMMARY

Disclosed herein is a cushioning medallion, comprising a polymeric gel material layer; a barrier layer disposed adjacent to the polymeric material; and a removable stabilization layer disposed adjacent to the polymeric layer and opposite the barrier layer; wherein the contours of the cushioning medallion are selected to correspond to the contours of a portion of a user's hand, and wherein the cushioning medallion conforms to the selected contours the portion of a user's hand upon application to the hand or to the interior surface of a glove.

The above described and other features are exemplified by the following figures and detailed description.

BRIEF DESCRIPTION OF THE DRAWINGS

Referring now to the figures, which are exemplary embodiments, and wherein like elements are numbered alike.

DETAILED DESCRIPTION

Figure 1:
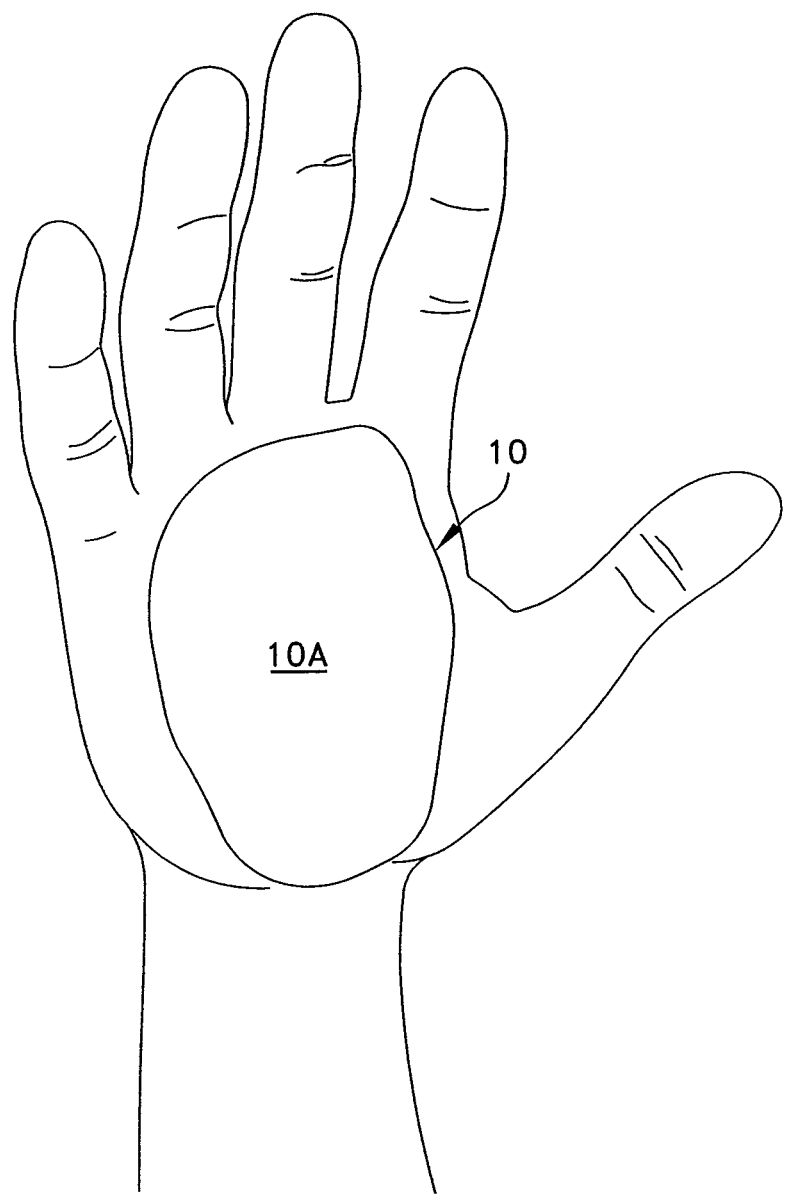
FIG. 1 is front view of an exemplary medallion applied to the palm of a user's hand.

The present disclosure is directed, in one embodiment, to a cushioning medallion and methods of use that provide open-air flow over the non-impact area of the hand, and complete dexterity of all the fingers. The medallions of the present embodiment eliminate the glove structure entirely as a method of securing the impact absorption to the hand. It should be understood that the present medallions can be used to replace full gloves in situations impact and vibration absorption is desired, as well as improved dexterity. For example, the present medallions can be used in sports such as golf, baseball, horseback riding, track and field, lacrosse, etc.

In another embodiment, the cushioning medallion is applied directly to the hand, and then the hand is inserted within a biking or work glove or baseball glove etc. The ability to attach this additional gel protection to the hand works to enhance the comfort of the glove structure. This can be especially useful when the glove still offers the user some protection or function and the user do not want to have an otherwise exposed hand. One e example would be a catcher's mitt in baseball where the glove is needed to catch the ball. In a garden or work glove, the remainder of the glove structure helps protect the skin from abrasion. Thus, in many cases, the medallion can work in conjunction with an outer glove structure. The benefits to the medallion in such cases include customizing the comfort without adding complexity or thickness to the entire glove.

In another embodiment, the cushioning medallion can be attached to the surface of a glove or other wearable item, either on the interior or exterior surface of the item. Although in the present embodiment, the glove structure is not eliminated, the medallions can be positioned and customized for each user, and they are re-usable and re-positionable. The medallions stick well to almost all glove surfaces, remaining in place and allowing the user flexibility. The medallion works ideally for this as well, and the only limitation is it needs to be of a shape that can be inserted and stuck to the glove. Some gloves that may be difficult to get a medallion inside of, and in such cases, adhering the medallion to the hand can be advantageous. In cases where the medallion is adhered to the inside surface of the glove rather than the hand, it can be desirable to have a fabric or other textile layer as the top surface of the medallion rather, which improves the feel against the skin and reduces perspiration.

In some embodiments, it can be desirable for the thickness of the medallions to vary, and medallions having thicker gel region combined with areas of minimal gel function well. The minimal gel areas can act as "hinges," allowing more dexterity of the hand. Where thick cushioning and flexibility is desired, the variation from thick regions to thin regions is desirable. The hinged regions provide the medallion with a greater degree of flexibility than a medallion of uniform thickness, which can limit dexterity. The hinge can run in any shape or direction depending on the design of the medallion and area of the hand covered. There can be multiple hinges as well, and the gap for the hinge can vary.

In some embodiments, the medallions can comprise "pillars" of gel, which allow flexing in multiple directions while maximizing the thickness of gel for cushioning. Another advantage of a pillar structure is reducing the weight of the medallion without reducing the thickness of the gel in areas needed for comfort.

The medallions can be designed for different sports or work gloves. The medallions can be applied to the hand, or the inside of the glove, or work by themselves adhered to the hand in some cases where that made sense. It is possible that in some boxing or fight gloves the gel pad would be affixed to the outside of the knuckles of the hand. The thickness and shape of these medallion inserts could be customized for the application. In a golf glove, the desired gel thickness may be very thin, for example. To use the medallions, one could purchase a standard leather work glove, and add gel comfort. One could add thicker gel for tough high vibration work (jackhammer for instance) or thinner gel where less cushion and vibration dampening are required. Examples of gloves in which the medallions could be used include at least the following: cycling, baseball, gardening, general work/tool gloves, boxing, golf, rowing, hockey, etc.

Figure 2:
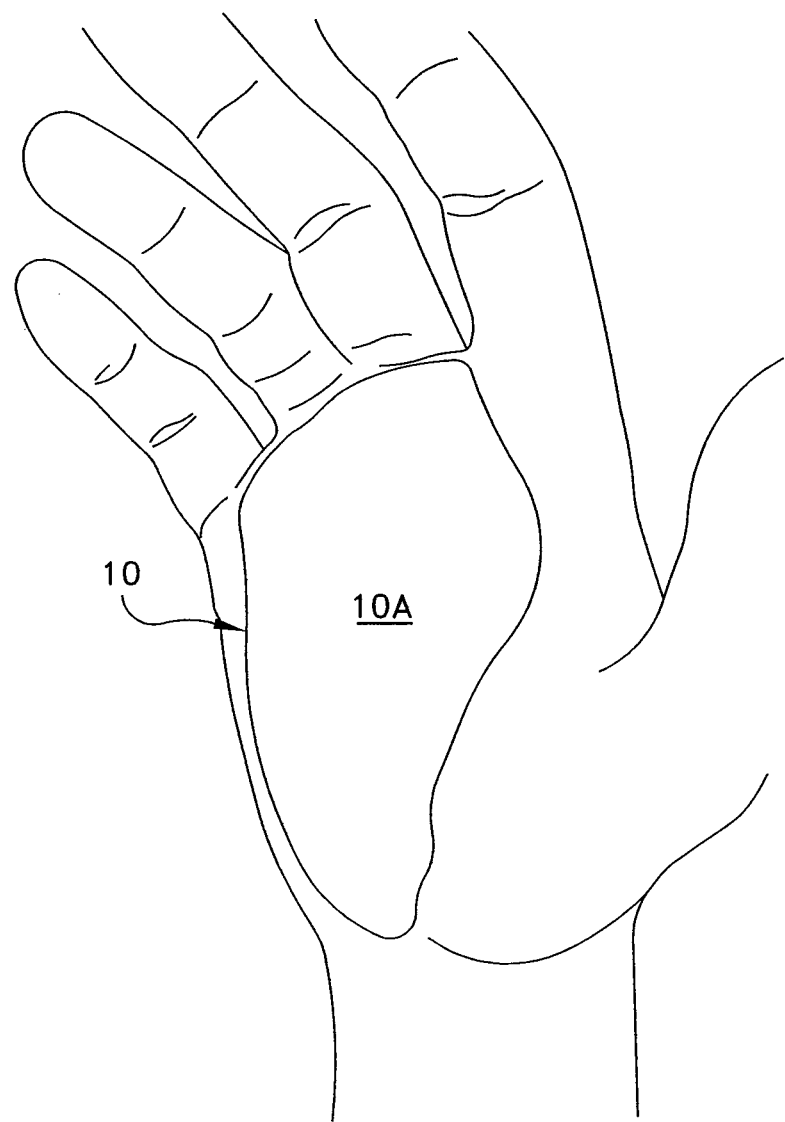
FIG. 2 is a perspective view of the medallion shown in FIG. 1.
Figure 3:
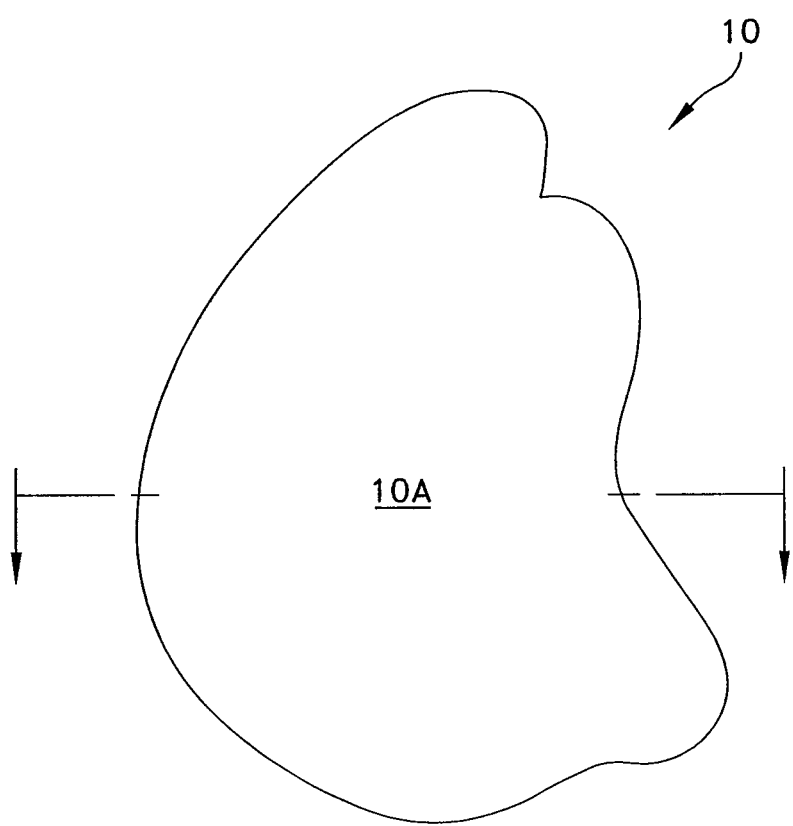
FIG. 3 is a top view of the medallion shown in FIGS. 1 and 2.
Figure 4:
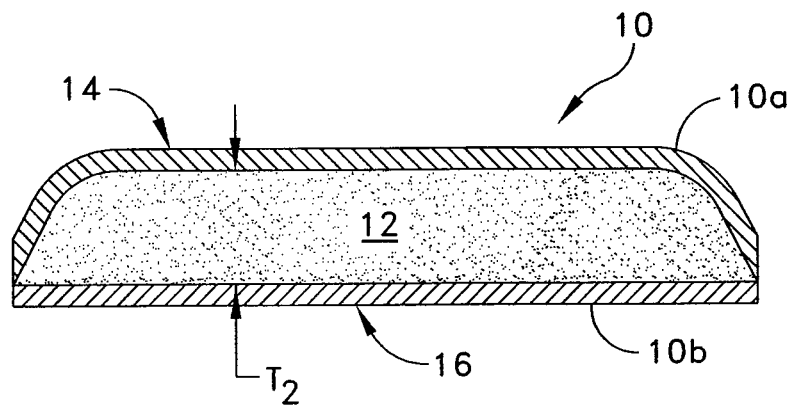
FIG. 4 is a side view of the medallion shown in FIG. 3.
Figure 5:
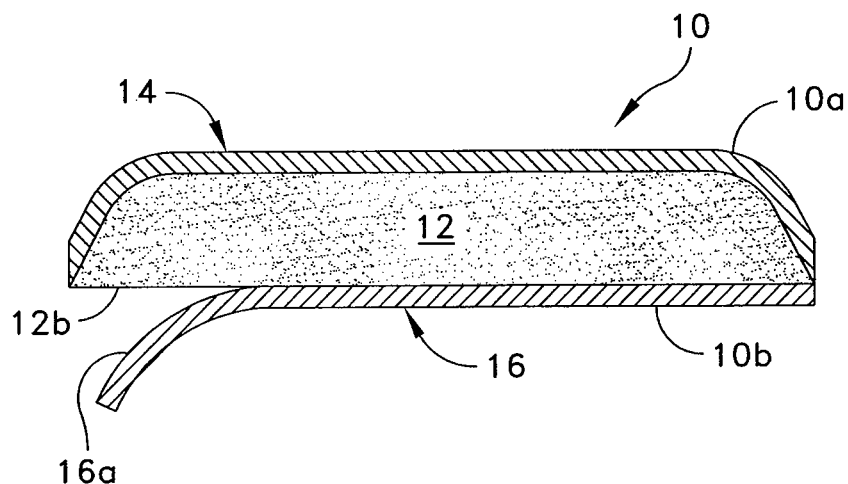
FIG. 5 is a side view of the medallion shown in FIG. 4, showing the method of removing the release liner.
Figure 6:
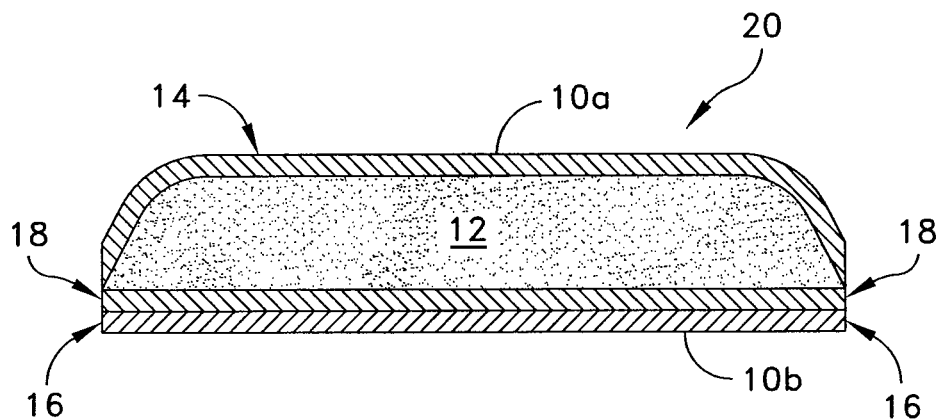
FIG. 6 is a side view of another exemplary medallion.
Figure 7:
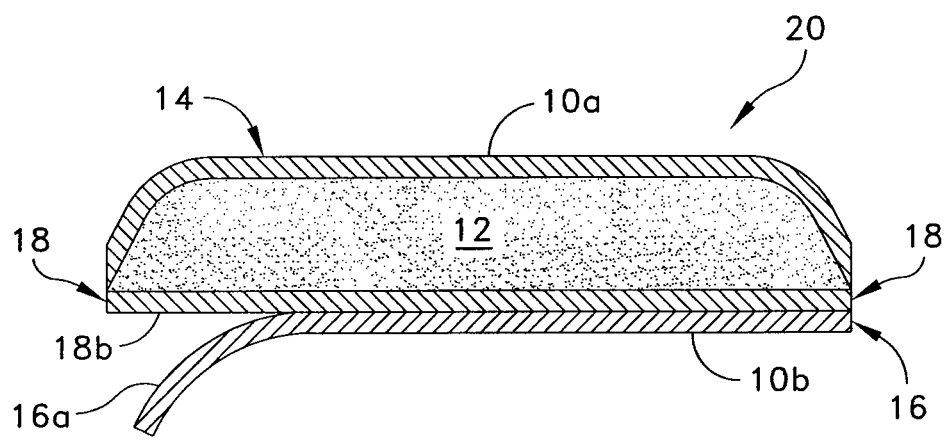
FIG. 7 is a side view of the medallion shown in FIG. 6, showing the method of removing the release liner.
Figure 8:
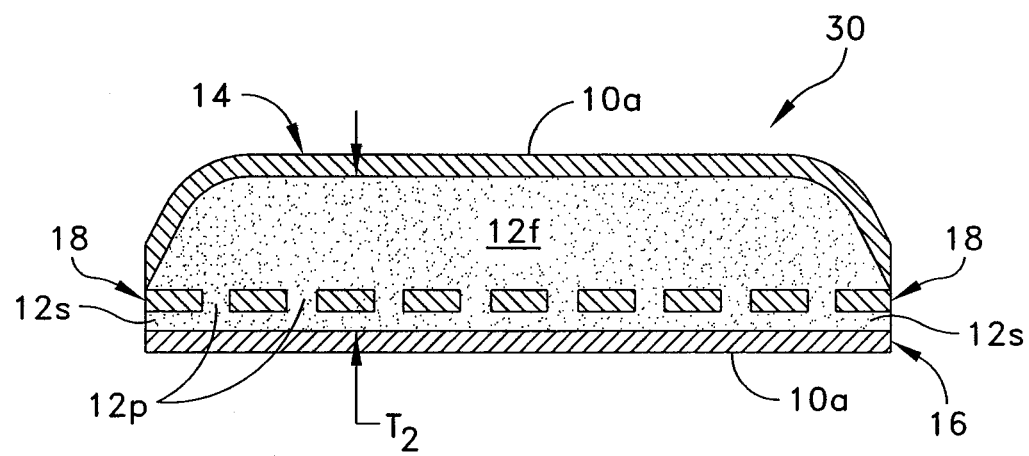
FIG. 8 is a side view of another exemplary medallion.
Figure 9:
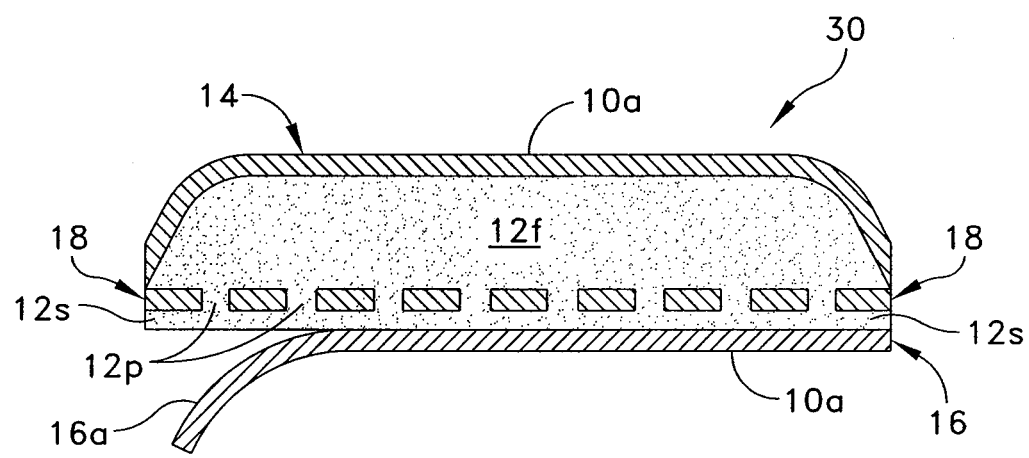
FIG. 9 is a side view of the medallion shown in FIG. 8, showing the method of removing the backing.
Figure 10:
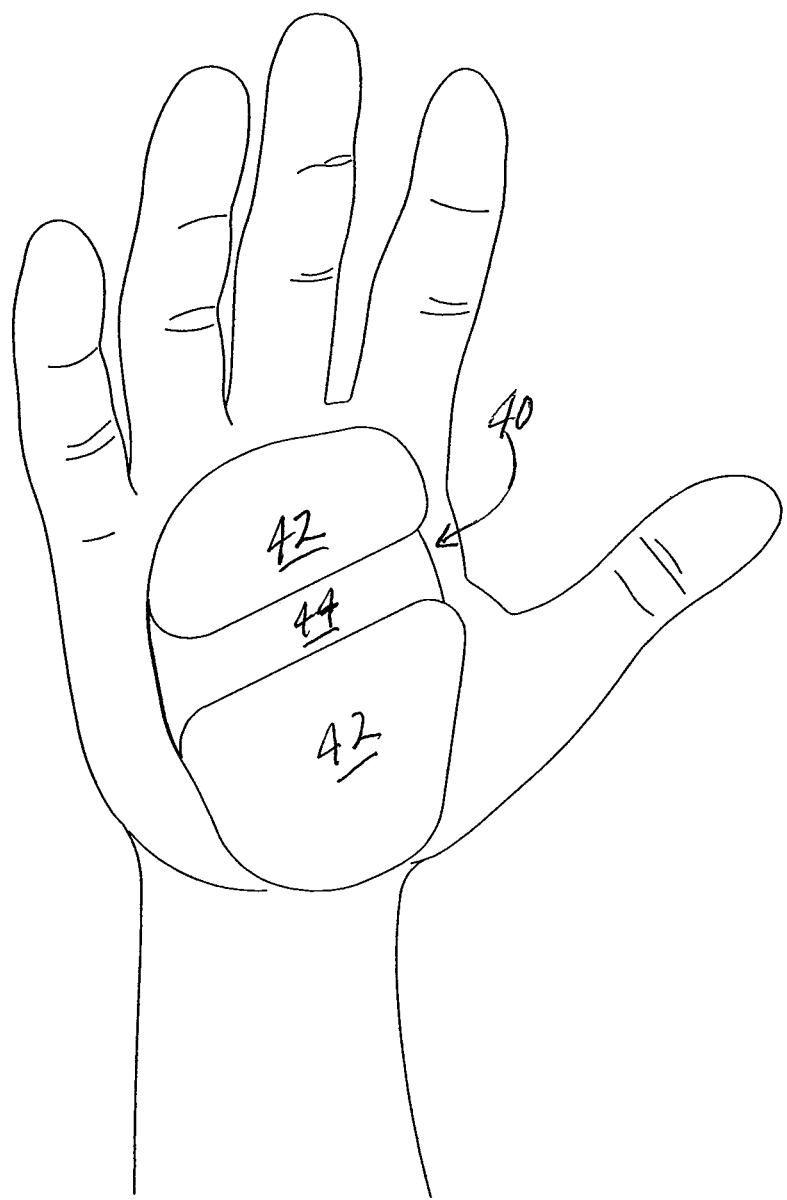
FIG. 10 is front view of another exemplary medallion applied to the palm of a user's hand.
Figure 11:
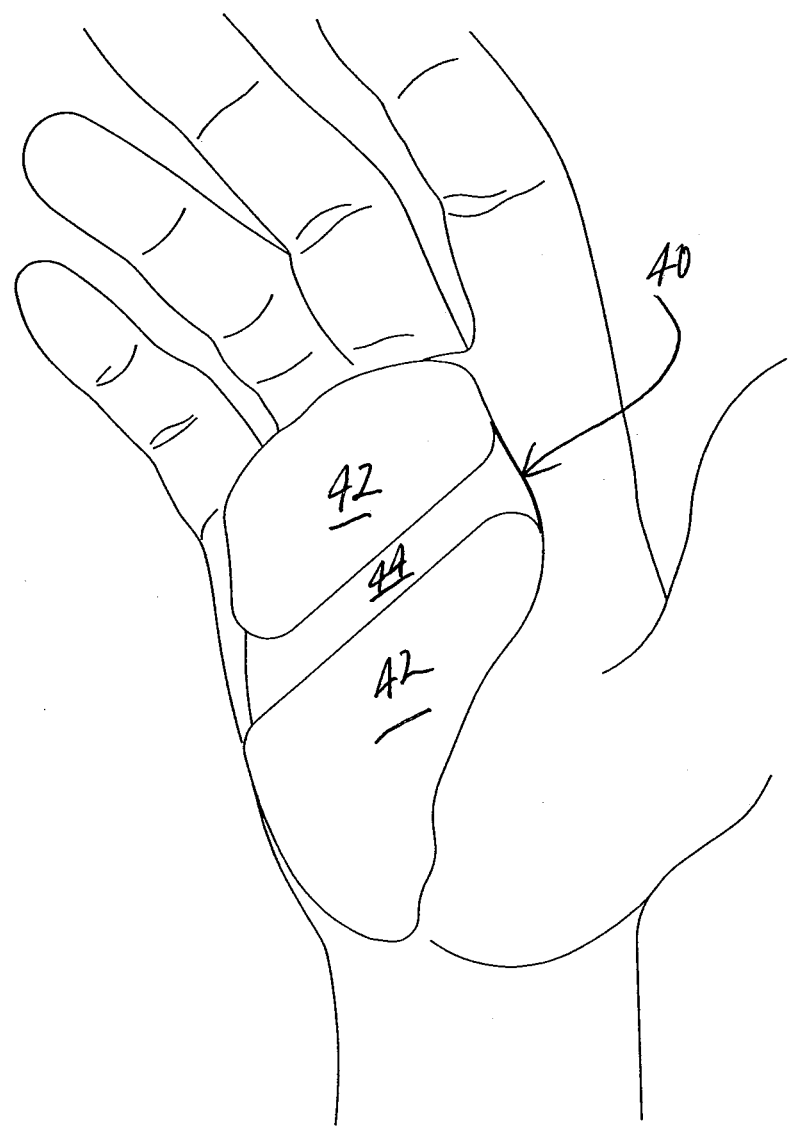
FIG. 11 is a perspective view of the medallion shown in FIG. 10.
Figure 12:
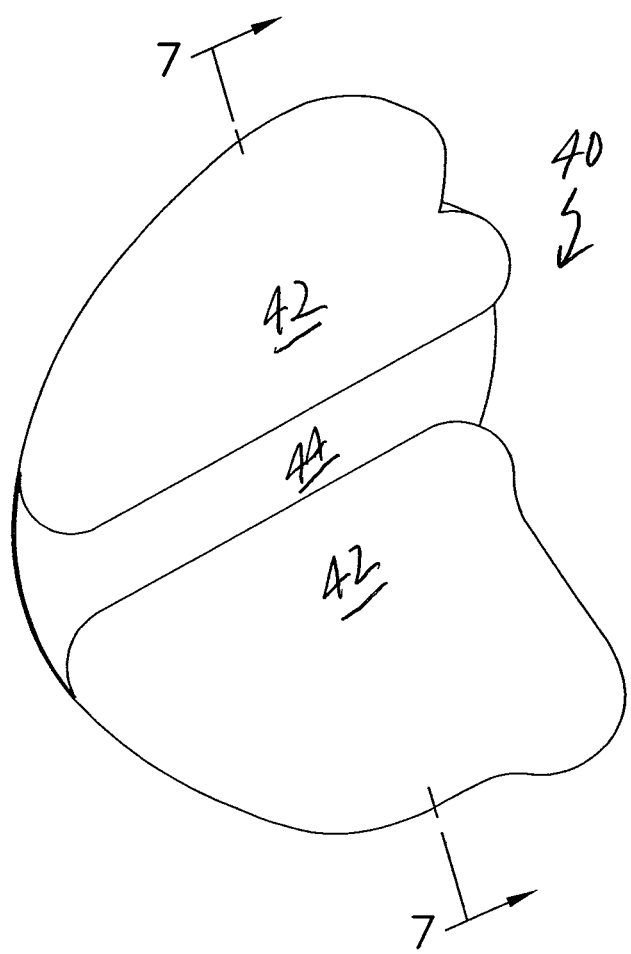
FIG. 12 is a top view of the medallion shown in FIGS. 10 and 11.
Figure 13:
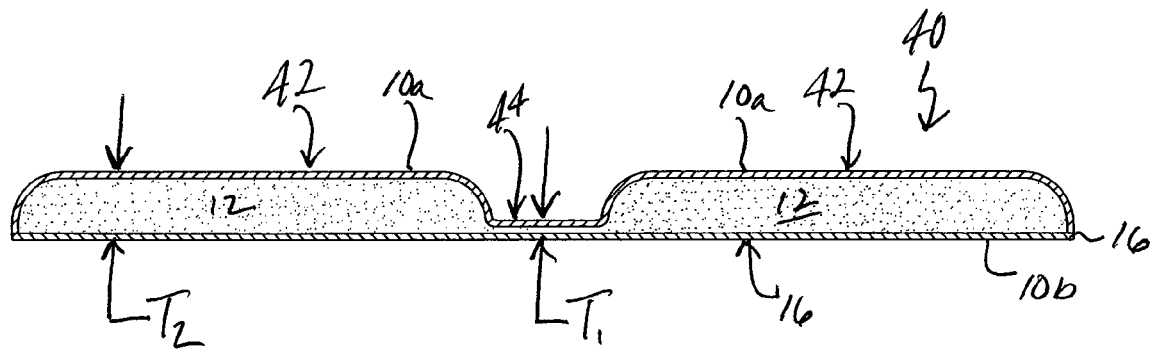
FIG. 13 is a side view of the medallion shown in FIG. 12.
Figure 14:
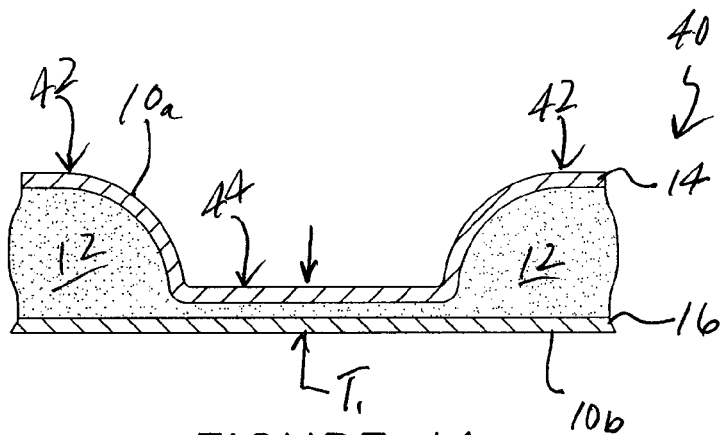
FIG. 14 is an expanded side view of a portion of the medallion shown in FIG. 13.
Figure 15:
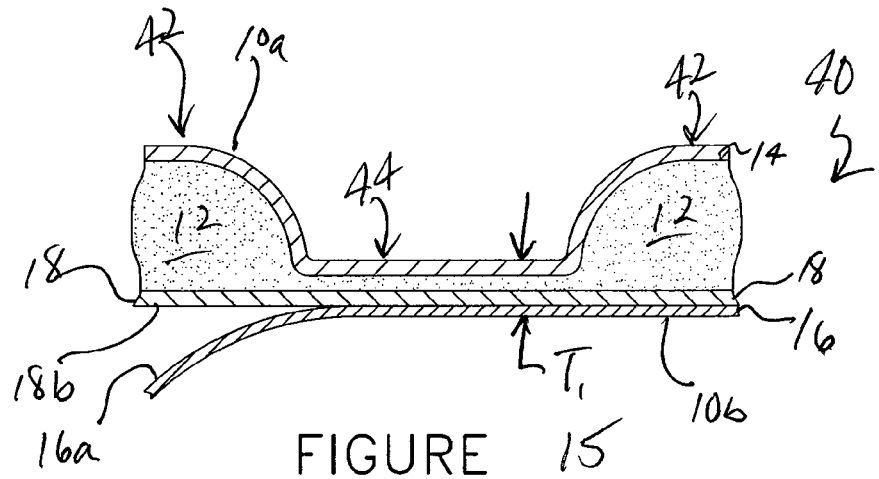
FIG. 15 is an expanded side view of another medallion, showing the method of removing the release liner.
Figure 16:
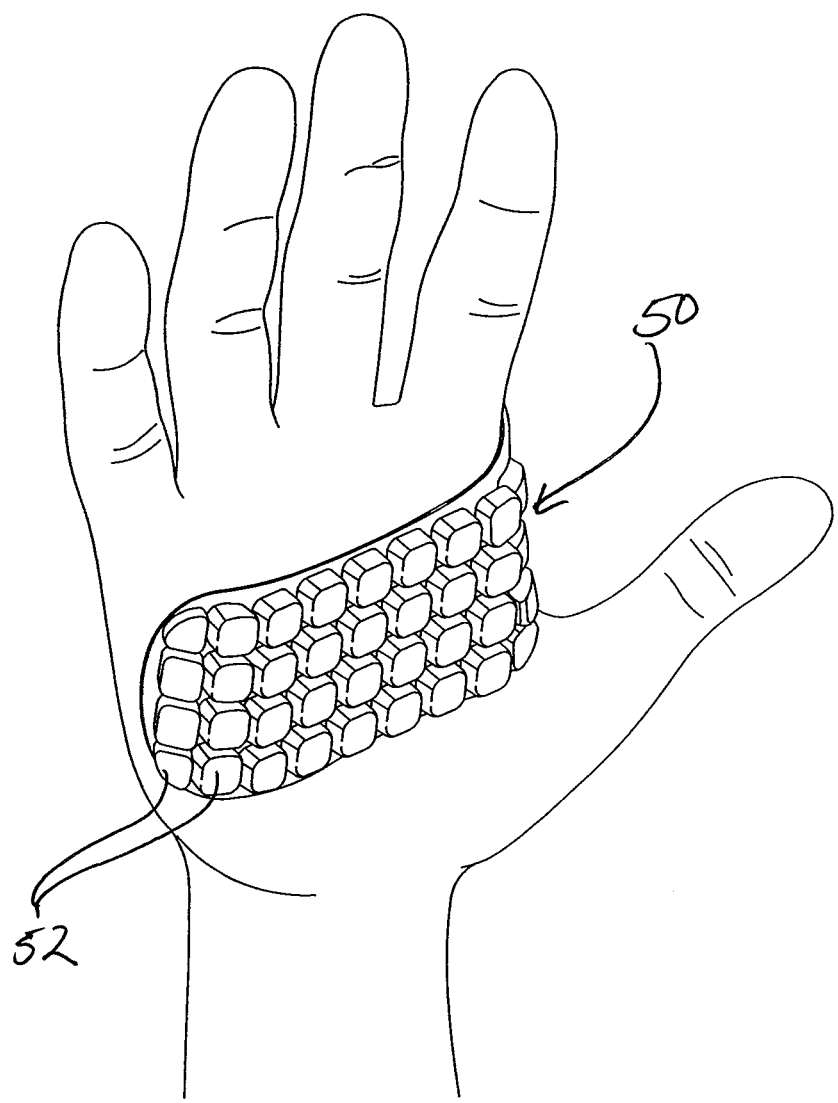
FIG. 16 is front view of another exemplary medallion applied to the palm of a user's hand.
Figure 17:
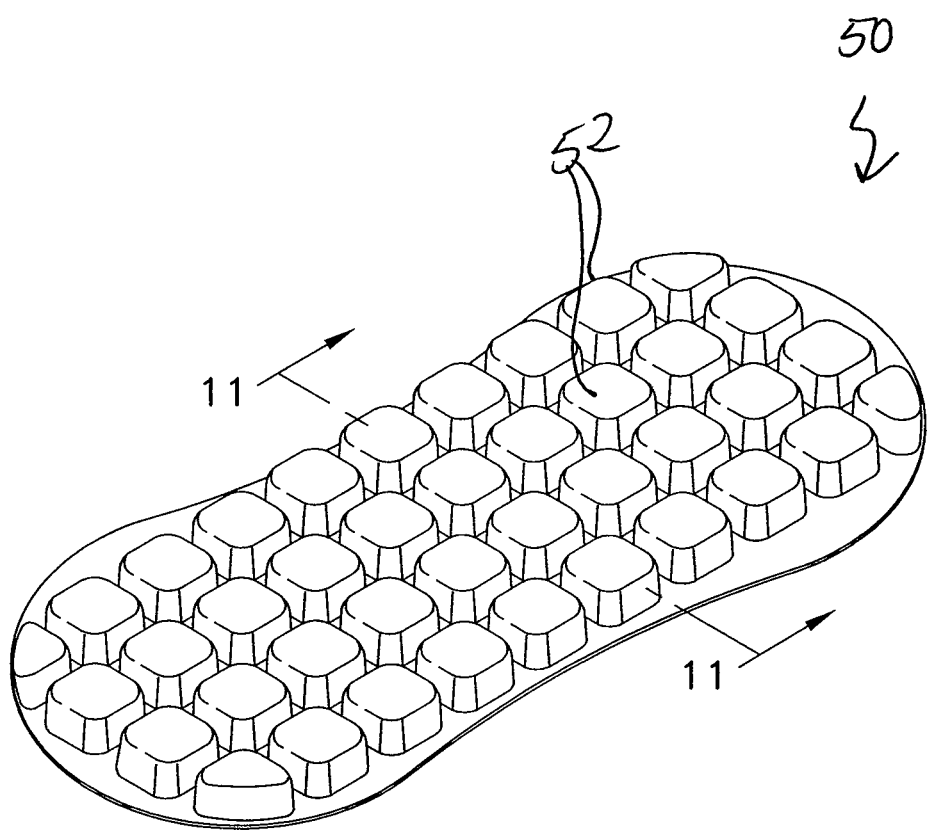
FIG. 17 is a perspective view of the medallion shown in FIG. 16.
Figure 18:
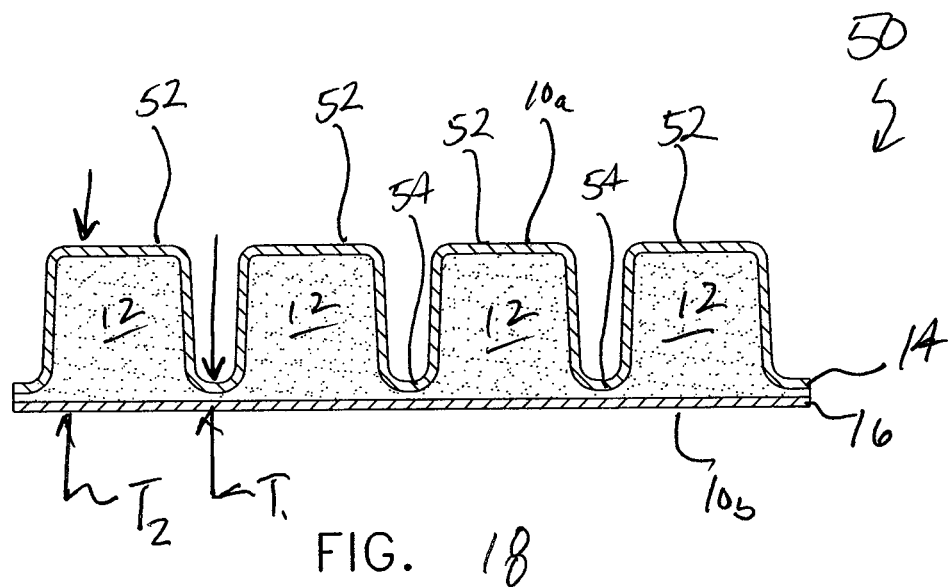
FIG. 18 is a side view of the medallion shown in FIG. 17.
Figure 19:
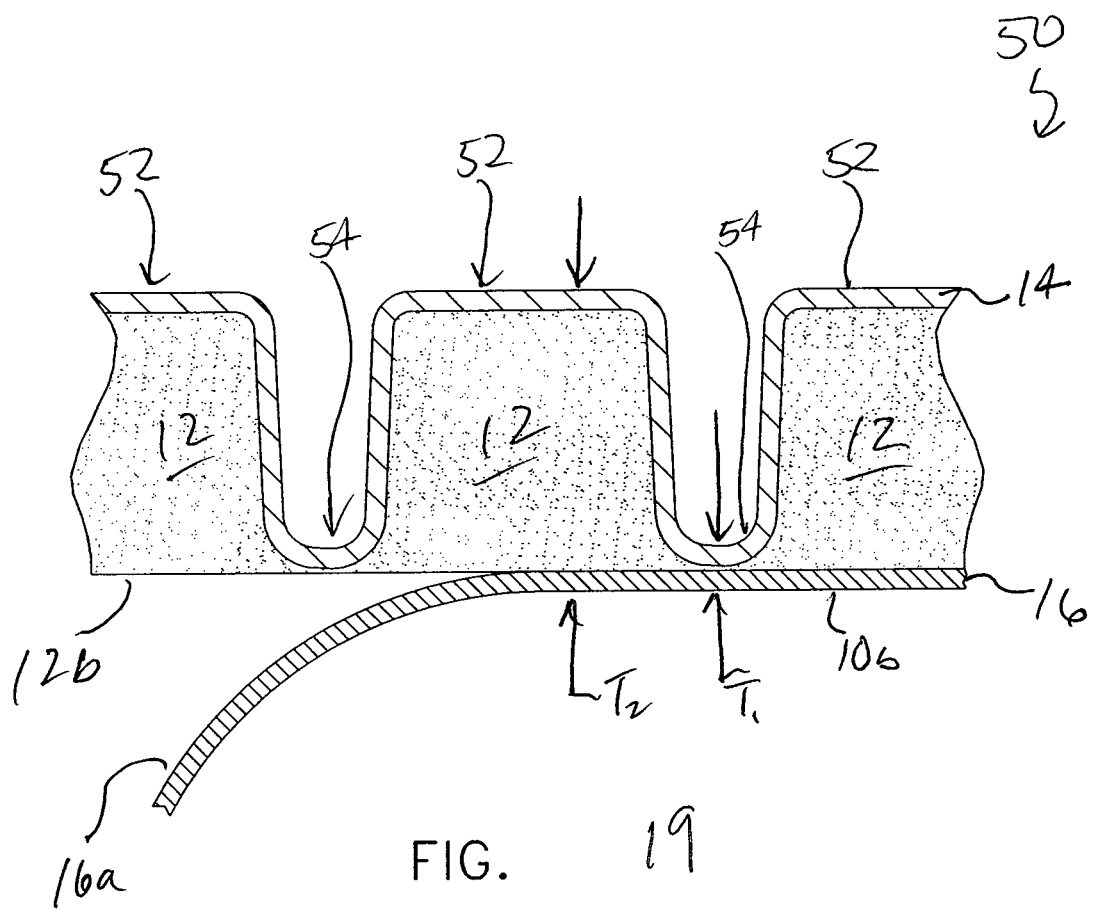
FIG. 19 is an expanded side view of a portion of the medallion shown in FIG. 18, showing removal of the release liner.

In the present disclosure, a cushioning medallion 10 can be formed into an appropriate shape for the palm, as shown in FIG. 1. In use, as shown in FIGS. 2 and 3, cushioning medallion 10 can be adhered directly to areas of the hand where impact and vibration needs to be dampened, e.g., the palm of the hand. Although illustrated herein as a cushioning medallion, it should be understood that medallions can be formed to absorb impact and vibration for other body areas as well. Such medallions can comprise any shape, size and/or configuration, and the foregoing can be tailored to the specific body regions, as desired.

FIGS. 1-5, when taken together, show a cushioning medallion 10 comprising opposing upper and lower surfaces 10a, 10b. As shown in cross-section in FIG. 4, cushioning medallion 10 comprises a viscoelastic gel layer 12 (hereinafter "gel layer"), a barrier layer 14 disposed adjacent to the gel layer 12, and an optional stabilizing layer 16 disposed adjacent to gel layer 12, opposite barrier layer 14.

In the present embodiment, gel layer 12 can comprise an adhesive strength sufficient to allow it to adhere to a surface, such as the palm of a user's hand or the inner surface of an article such as a glove. Thus, stabilizing layer 16 can optionally comprise a release coating (not illustrated) such as silicone, disposed on surface 16a, which can assist in the manual release of stabilizing layer 16 from surface 12b of gel layer 12, thereby exposing surface 12b of gel layer 12 in order to allow it to be adhered to a surface.

FIGS. 1-3 and 6 and 7, when taken together, show another exemplary cushioning medallion 20 comprising a gel layer 12, a barrier layer 14 disposed adjacent to gel layer 12, a fabric layer 18 disposed on a side of gel layer 12 opposite barrier layer 14, and a stabilization layer 16 disposed adjacent to fabric layer 18 and opposite gel layer 12. If desired, an adhesive can be disposed between fabric layer 18 and stabilization layer 16.

FIGS. 1-3 and 8-9, when taken together, show another exemplary cushioning medallion 30 comprising a first gel layer 12f, a barrier layer 14 disposed adjacent to first gel layer 12f, a fabric layer 18 disposed on a side of first gel layer 12f opposite barrier layer 14, a second gel layer 12s disposed adjacent to fabric layer 18 and opposite first gel layer 12f, and a plurality of gel portions 12p disposed in fabric layer 18, interconnecting first and second gel layers 12f, 12s. Optionally, a stabilization layer 16 can be disposed adjacent second gel layer 12s opposite first gel layer 12f.

In the present embodiment, fabric layer 18 can be at least partially fluid-permeable, which can allow penetration of a gel precursor through at least a portion of layer 18 (e.g., through the strands of a woven textile). Thus, during the molding process, when a gel precursor flows through layer 18 or a portion of layer 18, a tacky, adhesive surface can be formed on a side of layer 18 opposite first gel layer 12f, which surface can be a continuous or discontinuous layer, depending on the amount of gel precursor that flows through layer 18. Thus, in the final product, layer 18 can be sandwiched between the two gel layers 12f, 12s that are interconnected with gel portions 12p that extend through layer 18. It should be understood that the drawings are not to scale, and that the degree of penetration into and/or through layer 18 depends on a variety of factors including, but not limited to, the type of material, the thickness of material, the degree to which the material is fluid-permeable (e.g., the size of any pores and/or openings in layer 18, and the like), the viscosity of the gel, the molding pressure and temperature, and the like. Thus, the thickness of gel layer 12s, and whether layer 12s is continuous or discontinuous depends on the foregoing as well.

As noted above, the adhesive strength of gel layers 12f, 12s can vary, depending on a variety of factors. In one embodiment, if gel layer 12s has sufficient adhesive strength, it can be used to adhere the cushioning medallion 10 directly to a surface, such as a user's palm, thereby eliminating a separate adhesive. In another embodiment, an adhesive (not illustrated) can be disposed between gel layer 12s and stabilization layer 16, if desired. Cushioning medallion 10 can be disposed on a user's palm by peeling back and removing stabilization layer 16, exposing the adhesive gel layer 12s, and adhering gel layer 12s to the palm.

FIGS. 10-15, when taken together, show a cushioning medallion 40 comprising at least two chambers 42 separated by a flexible hinged region 44. Other elements in the drawings are the same as those previously discussed.

FIGS. 16-19, when taken together, show a cushioning medallion 50 comprising a plurality of gel containing pillars 52 separated be spacer regions 54. Other elements in the drawings are the same as those previously discussed.

In any of the foregoing embodiments, if desired, an adhesive (not illustrated), such as a pressure sensitive adhesive, can be disposed on the gel surface 12b or fabric surface 18b to allow cushioning medallion 10 to be adhered to a surface, such as a user's palm. Thus, stabilizing layer 16 can optionally comprise a release coating (not illustrated) such as silicone, disposed on surface 16a, which can assist in the manual release of stabilizing layer 16 from surface 12b, 18b, thereby exposing surfaces 12b, 18b for adhesion to a surface.

Also in any of the foregoing embodiments, if desired, an adhesive (not illustrated), such as a pressure sensitive adhesive, can be disposed on surface 10b to allow cushioning medallion 10 to be adhered to a surface, such as a user's palm. Such an option may be useful, for example, if fabric layer 18 does not comprise a pressure sensitive adhesive and/or if stabilizing layer 16 does not comprise a release coating on surface 16a. The addition of a pressure sensitive adhesive may also be useful in cases where the adhesive properties of the gel are not sufficient or are inappropriate for adhesion to the skin. For example, some specialized pressure sensitive adhesives are designed so as to maintain their tackiness after washing/cleaning, so that the medallion can be re-used a greater number of times.

In any of the foregoing embodiments, if desired, cushioning medallion 10 can comprise an active agent disposed in the barrier layer 14, for example, an antimicrobial agent and/or an antifungal agent, and the like. For example, barrier layer 14 can comprise an active agent such as silver, copper and/or zinc, to prevent the growth of odor-causing bacteria and/or inhibit the growth of fungus so as to prevent or treat the condition of athlete's foot. One possible barrier layer 14 comprising such an active agent is Vacuflex 18411 AG, available from Omniflex, Inc.

In any of the foregoing embodiments, if desired, the use of a colored or patterned layer 18 (e.g., a colored and/or patterned fabric layer) in combination with a transparent gel can provide what appears to be a colored or patterned gel article. This can create an article with much more color variations than would be possible with simply using colored or pigmented gel. The use of patterned fabrics or metallic sheen fabrics or other variations in the aesthetic of layer 18 can impart these aesthetics to the gel article; such aesthetics would be difficult or impossible to impart to the gel article by pigmenting the gel or printing the gel article. This process also offers a potential economic advantage to coloring or printing the gel.

In the present illustrative embodiment, the thickness of cushioning medallion 10 can vary from total thickness $T_2$ of about ⅛ inch up to about 3 inches.

In one embodiment of the disclosure, a low durometer elastomeric gel with a Shore 00 hardness of about 55 can be molded into a structure comprising a shape that conforms to a least a portion of the palm of a hand, and having a thickness of approximately 0.060". The exposed surface of the gel 12 can be covered with a TPU film 14 of about 0.00075" in thickness. The low durometer gel 12 can be covered on the back with a release liner 16 which can be removed just prior to use. Upon moving the release liner 16, the user can apply the gel padding 12 directly to the palm of the hand to absorb impact while cycling. The low durometer gel 12 has an inherent tackiness providing for adhesion to the skin surface. The TPU film layer 14 can optionally contain an active agent such as antimicrobial silver to prevent the growth of microorganisms. The gel can be clear or pigmented for aesthetics.

In other embodiments of the present disclosure, this "gloveless glove" can have a surface of a textile layer or of a leather layer instead of the TPU film. In addition, in other embodiments of the disclosure, a separate adhesive layer can be utilized on the back of the gel layer if different adhesive properties are desirable.

In still other embodiments of the present disclosure the "gloveless glove" can be formed from other cushioning materials such as foamed plastics and the like.

It can be easily appreciated by one skilled in the art how the concept of the gloveless bicycle glove can be applied to other bodied cushioning applications such as knee pads, elbow pads, etc., to create an array of body cushioning and protecting products that are unique in the fact that they are not affixed to the body using a textile structure, but rather are directly applied.

In another aspect of the disclosure, formation of the foregoing medallions is facilitated by various processing techniques and materials. Examples of suitable materials and techniques for forming the present medallions can be found in U.S. Pat. No. 7,827,704, which issued on Nov. 9, 2010, and U.S. Provisional Application No. 60/044,859, which was filed on Apr. 14, 2008, each of which is incorporated herein by reference in its entirety. The materials and methods disclosed in the foregoing applications provide an inexpensive method of molding a variety of commodity products comprising various degrees of hardness. In particular, gels having relatively low durometers, such as viscoelastic gels, can be extremely tacky, making them difficult or impossible to use in commercial processing techniques such as injection molding, because the materials will adhere to the molds. In addition, such materials have relatively low durability in comparison to other materials, including other polymeric materials. Thus, applications for relatively low durometer gel materials have been limited, despite their advantageous pliability and softness characteristics. It should be understood that the method is not limited to polymeric materials, and that materials other than polymeric materials can be molded with the method (e.g., composite materials, and the like).

The foregoing methods and materials can facilitate the manufacture of polymeric articles and/or regions of articles, which can be desirable for aesthetics and/or to minimize wear and/or friction. The methods can be used to form polymeric articles and/or regions of articles, comprising any size, thickness or geometry. The size, thickness, geometry, softness, and adhesive strength of the articles and/or portions of the articles can be selected to optimize the conditions for which it is designed. Examples of articles in which the foregoing polymeric materials can be useful include, but are not limited to, handles for personal care objects such as hairbrushes, toothbrushes and razors; medical devices such as masks, crutches and casts; handles for household objects such as brooms; straps for luggage, backpacks, briefcases and purses; clothing such as cycling shorts, undergarments and shoes; utility objects such as mousepads, keyboard rests; handles and/or straps for consumer goods such as bottles and/or boxes, laundry detergent handles; sporting goods equipment and accessories such as racquet grips, bat handles, fishing rod grips, guns, and bicycle handlebar grips; and the like. In addition, the articles can comprise indicia such as labels with color, text and/or graphics, and the like.

While the disclosure has been described with reference to an exemplary embodiment, it will be understood by those skilled in the art that various changes may be made and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure not be limited to the particular embodiment disclosed as the best mode contemplated for carrying out this disclosure, but that the disclosure will include all embodiments falling within the scope of the appended claims.

What is claimed is:

1. In combination:
   a cushioning medallion, comprising:
      a polymeric gel material layer;
      a barrier layer disposed adjacent to the polymeric material; and
      a removable stabilization layer disposed adjacent to the polymeric layer and opposite the barrier layer; and
   a glove, comprising:
      an interior surface;
   wherein upon removal of the removable stabilization layer from the polymeric gel layer of the cushioning medallion and application of the polymeric gel layer to the interior surface of the glove, the polymeric gel layer is operative to removably adhere to the interior surface of the glove.

* * * * *